(12) United States Patent
Fleurence et al.

(10) Patent No.: US 10,589,703 B2
(45) Date of Patent: Mar. 17, 2020

(54) METHOD FOR PRESENTING INFORMATION UPON STARTING AN AUTOMOTIVE VEHICLE

(71) Applicant: VALEO VISION, Bobigny (FR)

(72) Inventors: Thierry Fleurence, Augny (FR); Nicolas Boiroux, Asnieres sur Oise (FR); Antoine Boilevin, Vincennes (FR)

(73) Assignee: VALEO VISION, Bobigny (FR)

( * ) Notice: Subject to any disclaimer, the term of this patent is extended or adjusted under 35 U.S.C. 154(b) by 381 days.

(21) Appl. No.: 15/439,155

(22) Filed: Feb. 22, 2017

(65) Prior Publication Data

US 2017/0240130 A1 Aug. 24, 2017

(30) Foreign Application Priority Data

Feb. 24, 2016 (FR) ..................... 16 51533

(51) Int. Cl.
| | | |
|---|---|---|
| *B60R 21/015* | (2006.01) | |
| *B60K 35/00* | (2006.01) | |
| *B60K 28/06* | (2006.01) | |
| *B60N 2/00* | (2006.01) | |
| *F02N 11/08* | (2006.01) | |
| *B60K 28/00* | (2006.01) | |

(52) U.S. Cl.
CPC ...... *B60R 21/01538* (2014.10); *B60K 28/063* (2013.01); *B60K 35/00* (2013.01); *B60N 2/002* (2013.01); *B60R 21/01552* (2014.10); *F02N 11/0803* (2013.01); *F02N 11/0814* (2013.01); *B60K 2028/003* (2013.01); *B60K 2370/1868* (2019.05); *B60K 2370/334* (2019.05); *B60K 2370/771* (2019.05); *B60K 2370/788* (2019.05); *B60K 2370/794* (2019.05)

(58) Field of Classification Search
CPC ........... B60R 21/01538; F02N 11/0803; F02N 11/0814; G02B 27/0101
See application file for complete search history.

(56) References Cited

U.S. PATENT DOCUMENTS

| | | | | |
|---|---|---|---|---|
| 4,740,780 | A * | 4/1988 | Brown | G02B 27/01 345/7 |
| 6,820,709 | B1 * | 11/2004 | Zimmermann | B60K 31/0008 180/169 |
| 2012/0166058 | A1 * | 6/2012 | Armbrust | B60Q 1/525 701/96 |
| 2013/0151111 | A1 * | 6/2013 | Skelton | B60R 25/00 701/99 |

(Continued)

FOREIGN PATENT DOCUMENTS

| | | |
|---|---|---|
| DE | 10 2013 016 250 A1 | 4/2015 |
| DE | 10 2014 213 683 A1 | 1/2016 |

(Continued)

*Primary Examiner* — Eric L Bolda
(74) *Attorney, Agent, or Firm* — Oblon, McClelland, Maier & Neustadt, L.L.P.

(57) ABSTRACT

A method for presenting information upon starting an automotive vehicle includes at least one step in which various parameters associated with the vehicle are verified. Also included is a step in which a particular light beam is projected onto a specific area of the passenger compartment of the vehicle when the state of a plurality of verified parameters allows the vehicle to be started.

20 Claims, 1 Drawing Sheet

(56) References Cited

U.S. PATENT DOCUMENTS

| | | | | |
|---|---|---|---|---|
| 2013/0187770 A1* | 7/2013 | Moussa | ............... | G02B 27/0101 |
| | | | | 340/425.5 |
| 2014/0309910 A1* | 10/2014 | Hesketh | ............... | F02N 11/0822 |
| | | | | 701/112 |
| 2015/0138816 A1 | 5/2015 | Salter et al. | | |
| 2017/0350360 A1* | 12/2017 | Tedesco | ................... | B60T 7/18 |

FOREIGN PATENT DOCUMENTS

| | | |
|---|---|---|
| EP | 1 798 588 A1 | 6/2007 |
| FR | 2 921 602 A1 | 4/2009 |
| WO | WO 2015/145607 A1 | 10/2015 |

* cited by examiner

METHOD FOR PRESENTING INFORMATION UPON STARTING AN AUTOMOTIVE VEHICLE

The invention concerns the field of lighting and/or signaling, in particular for automotive vehicles. It pertains more specifically to the field of interior lighting and to that of presenting information to the occupants of the vehicle, in particular information relating to the risk-free driving of the vehicle.

Modern vehicles incorporate a multitude of diagnostic tools for diagnosing the operating state of critical components of the vehicle. The driver can thus see information on his or her instrument panel when the tire pressure is insufficient, the oil level is too low, the seat belts are not buckled, etc. This information consists of warning lights indicating that action is to be taken on a given component in order to ensure the safety of the driver and of the passengers of the vehicle. The totality of the information is notably collected together on the instrument panel in front of the driver, the latter having to check whether warning lights are present or absent before starting the vehicle. A result of this is that the passengers of the vehicle are not able to learn of a potential situation that could jeopardize the safe driving of the vehicle. On certain vehicles, an acoustic alarm is used to announce the presence of such a warning light and the need for the driver to look at the instrument panel. Such an acoustic alarm is effective; however, it is not pleasant for the occupants of the vehicle.

In this context, a subject of the invention is a method for presenting information upon starting an automotive vehicle, in which various parameters associated with the vehicle are verified, and in which a particular light beam is projected onto a specific area of the passenger compartment of the vehicle when the state of a plurality of verified parameters allows said vehicle to be started.

Thus, the driver is given information summarizing various operating states or conditions of the road scene in which the vehicle must be engaged. It is advantageous for said specific area to be, in particular, separate from the instrument panel, in order to provide information to the occupants of the vehicle which is not drowned out by the stream of information available on the instrument panel and which is furthermore visible by all occupants of the vehicle, including both front and rear passengers.

According to one feature of the invention, a first particular light beam is projected onto a first specific area of the passenger compartment of the vehicle when the state of a plurality of the verified parameters forming a first functional group allows said vehicle to be started, and a second particular light beam is projected onto a second specific area of the passenger compartment of the vehicle when the state of a plurality of the verified parameters forming a second functional group allows said vehicle to be started. The first specific area and the second specific area may be lit up in successive sequences.

Thus, a specific projection area is associated with information on the vehicle summarizing a certain type of verified parameters. The set of parameters to be verified is split into a plurality of functional groups which are considered to be separate sets, each set providing, after analysis, summarized information in favour of or against starting the vehicle. It could be advantageous to choose the specific area onto which information summarizing a group of particular parameters is projected depending on the type of corresponding parameters: information relating to the road scene and, in particular, to the absence of hazards in the blind spot could be the subject of a projection on the left windscreen pillar, while information on the operating state of the drive, braking, steering, etc. elements could be the subject of a projection on the dashboard, and information on whether the doors have been locked correctly could be the subject of a projection on the driver's door handle. These application areas for the projection of information have been given by way of example and may be modified as required without departing from the scope of the invention.

Provision may also be made for a first alternative light beam, separate from said particular light beam, to be projected onto said projection area, or in proximity thereto, when one or more of the verified parameters does not allow said vehicle to be started. It is additionally possible for a second alternative light beam, separate from said particular light beam and from said first alternative light beam, to be projected onto said projection area, or in proximity thereto, when each of the verified parameters allows said vehicle to be started, and at least one of these parameters requires particular attention on the part of the driver.

A control module may receive information arising from a plurality of sensor means configured to verify one of the various parameters associated with the vehicle, said control module comparing each item of this information with a database specific to each verified parameter and deducing therefrom a type of light beam to be projected.

According to a series of features, taken alone or in combination, in which the verified parameters are both parameters internal to the vehicle and parameters external to the vehicle, provision may be made for:

the external parameters to be verified by sensors on board the vehicle and configured to detect a situation of a road scene in which the vehicle is engaged;

one of the external parameters to be in particular the presence of one or more road users in the blind spot of the vehicle;

the internal parameters to be verified by sensors on board the vehicle and configured to detect an operating state of the vehicle;

at least some of the internal parameters to relate to active or passive safety means of the vehicle;

at least some of the internal parameters to relate to drive, braking, steering, etc. elements of the vehicle.

According to a first variant embodiment of the method according to the invention, provision may be made for a light beam to be projected onto a specific area of the passenger compartment from a second area of this passenger compartment, separate from said specific area. In particular, a light beam may be projected onto the front window pillar, or onto a portion of the windscreen, from the interior central rear-view mirror or from an area close to the rear-view mirror.

According to a second variant embodiment of the method according to the invention, a light beam may be projected onto a specific area of a structural element of the passenger compartment, from the interior of said structural element.

According to other features of the invention, provision may be made for:

the various parameters to be verified when the speed of the vehicle is below a threshold value, so as to be able to project a light beam relating to permission to start the vehicle as soon as an acceleration is detected;

the various parameters to be verified in real time.

Other features and advantages of the present invention will become more clearly apparent in the light of the description and the drawings, in which.

Figure 1:
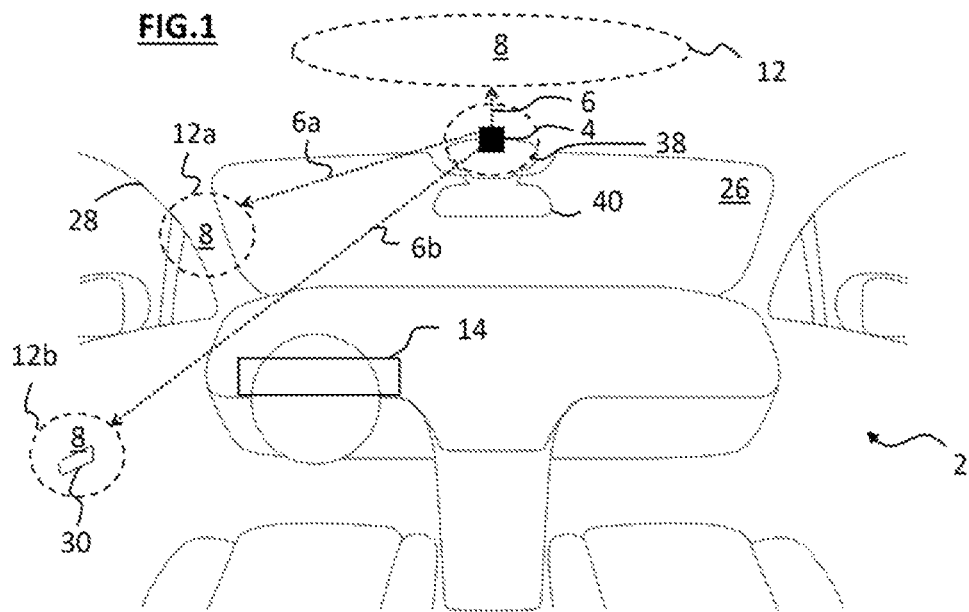
FIG. 1 is a schematic representation of a passenger compartment of an automotive vehicle, in which a device for projecting a light beam for the presentation of information according to the invention has been illustrated along with three projection-bearing areas onto which the light beam is liable to be projected after various parameters associated with the vehicle have been verified.

An automotive vehicle is equipped with at least one interior lighting device for illuminating its passenger compartment 2, particular in that it comprises means 4 for projecting a light beam 6 configured to present information 8 to the occupants of the vehicle relating to the good working order of the vehicle before it is started and taken out onto the road.

These means take part in implementing a method for presenting information in which information received from various sensors placed in or around the vehicle is summarized in order to check that parameters 10 of the vehicle, which correspond to this information, are capable of allowing completely safe driving. Such a method allows the result of this summarization to be displayed to the occupants, and in particular to the driver, by means of a luminous display, which is advantageously projected into a specific area 12 that can be seen by a plurality of occupants of the vehicle and, in particular, is separate from the instrument panel 14 positioned facing the driver.

The verified parameters 10 may be both parameters internal to the vehicle and parameters external to the vehicle. In the latter case, it is understood that the external parameters may be verified by sensors embedded in the vehicle or by external elements that are capable of communicating with the vehicle. These external parameters in particular relate to a situation of the road scene in which the vehicle is engaged and, for example, to the presence of one or more road users in the blind spot of the vehicle.

The internal parameters are verified by sensors which are on board the vehicle and configured to detect a respective operating state of the vehicle. At least some of the internal parameters may relate to active or passive safety means of the vehicle, or to drive, braking, steering, etc. elements of the vehicle.

The set of detected information 8, relating to each parameter to be verified 10, is processed by a control module 16 that compares, in one or more comparison steps 18, each item of this information 8 with a database that is specific to each verified parameter and which summarizes all of these comparisons in order to deduce therefrom whether a light beam 6 must be projected in order to notify the occupants of the vehicle that the vehicle is capable of being started.

According to one variant embodiment, the control module 16 is able to determine various operating states of the vehicle by means of this step 18 of comparing the verified parameters with reference values, and the control module therefore deduces from this step which type of beam 6 should be projected in order to correctly notify the occupants.

Stated otherwise, the following complimentary cases may be envisaged:

when one or more of the verified parameters does not allow said vehicle to be started, a first alternative light beam 20, separate from the light beam 6 projected when all of the verified parameters are acceptable, may be projected onto the same specific projection area 12 as that of the latter, or in proximity to this same projection area: this first alternative beam 20, being for example red while the light beam projected when all of the verified parameters are acceptable is green, notifies the driver and each of the occupants that the vehicle should not be started.

when each of the verified parameters allows said vehicle to be started and at least one of these parameters requires particular attention on the part of the driver, a second alternative light beam 22, separate from said light beam 6 projected when all of the verified parameters are acceptable and separate from the first alternative light beam projected when at least one verified parameter is unacceptable for driving, can be projected.

Figure 2:
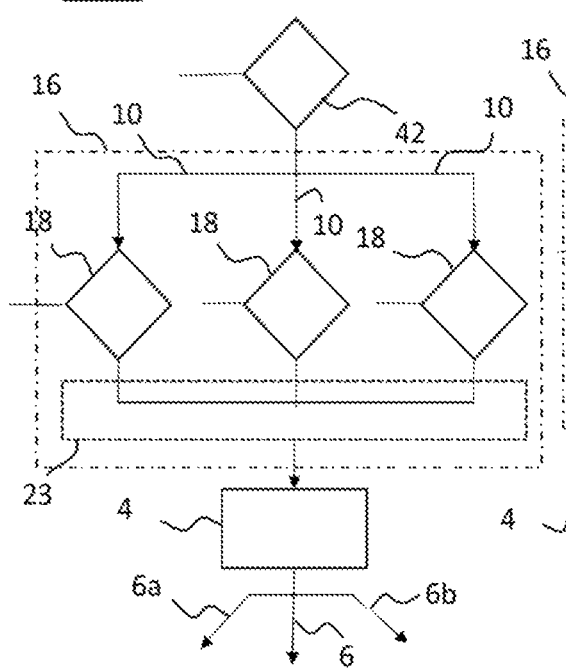
FIGS. 2 and 3 are flow diagrams, each representing one embodiment of the method for presenting information according to the invention.

This possibility has been illustrated in FIG. 2 such that the projection means 4 are configured to emit a particular light beam 6, a first alternative light beam 20 or a second alternative beam 22 depending on the result of the summarization carried out by a computing module 23 of the control module.

In this first embodiment, the light beam 6 is projected onto the same area of the passenger compartment each time the vehicle is started. The set of parameters to be verified 10 is processed by the control module on the basis of values detected by sensor means and a step 18 of comparing each of these parameters with threshold values is successively carried out, followed by the totality of the data from these tests being summarized by the computing module 23 of the control module 16, resulting in a datum giving authorization for the vehicle to be started. It is understood, in particular when the information delivered by the projected beam is information apprising of a state of the vehicle that does not ensure complete safety of the occupants, that it may be advantageous for the projected information to be visible by all in the passenger compartment, and this therefore explains the choice of a specific beam projection area 12 that is visible by all, for example on the ceiling 24, on the windscreen 26, on a pillar 28 of the latter or on each of the door handles 30.

Figure 3:
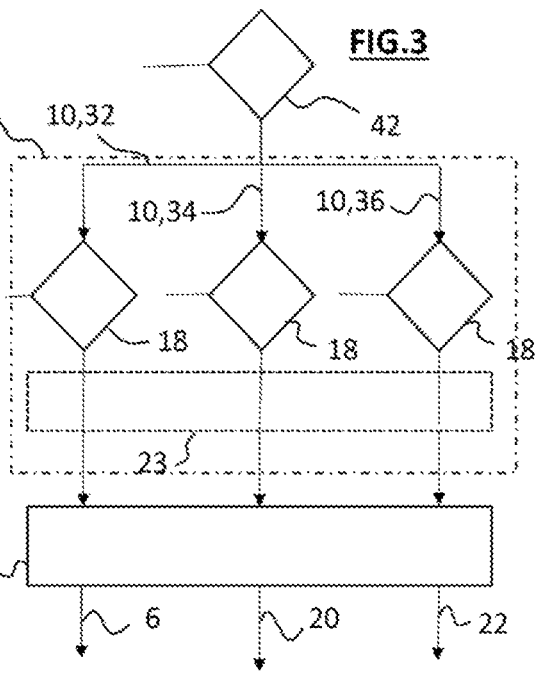

According to a second embodiment, illustrated in particular in FIG. 1 and in FIG. 3, the light beam may be projected onto various areas of the passenger compartment, and the choice of a given projection-bearing area may in particular be made according to the information that has been verified. The control module 16 is programmed to split at least some of the parameters to be verified 10 into a first functional group 32, for example relating to the operating state of the drive, braking, steering, etc. elements of the vehicle, into a second functional group 34, relating for example to the good working order of the passive safety elements, such as the buckling of the seat belts or the closing of the doors, or else into a third functional group 36, relating for example to the situation of the road scene around the vehicle and the presence of road users who may or may not disrupt the starting of the vehicle. Thus, it is possible to project a first particular light beam 6a onto a first specific area 12a of the passenger compartment of the vehicle when the state of a plurality of the verified parameters forming a first functional group 32 allows said vehicle to be started, and it is possible to project at least one second particular light beam 6b onto a second specific area 12b of the passenger compartment of the vehicle when the state of a plurality of the verified parameters forming a second functional group 34 allows said vehicle to be started.

The particularity of this embodiment of the method has been illustrated in FIG. 3, in which the summarization by the computing module is carried out per functional group of parameters, so that the projection means produce a projection of a specific beam separately from the other functional groups.

In this case in which multiple areas are illuminated separately in order to show the state of various functional groups of parameters, provision may be made for the first specific area and the other specific areas to be illuminated in successive sequences.

The projection means 4 consist of a lighting module comprising at least one light source and one optical projection system. The source is turned on by the control module when information must be presented to the occupants of the vehicle, and the optical projection system, or the overall lighting module according to the chosen variant embodiments, is moved in order to orient the projected beam onto a given projection-bearing area. A light beam 6 is projected onto a specific area 12 of the passenger compartment from a second area 38 of this passenger compartment, separate from said specific area. As illustrated in FIG. 1, provision may in particular be made for this controllable lighting module to be placed in the area above the windscreen 26, directly above the dashboard, for example by being integrated into the interior central rear-view mirror 40 or into an area close to the rear-view mirror, in order to facilitate the projection of the beam both onto the windscreen pillar 28 and onto at least one door handle 30, or onto the ceiling 24. It is noteworthy that, according to one particular embodiment of the invention, provision may be made for the information projected to the occupants of the vehicle to be information backlit onto the projection-bearing area.

As stated above, the parameters 10 are verified upon starting the vehicle. Thus, in the two embodiments of the method presented above, provision may also be made for this verification to take place each time the vehicle is restarted, in particular by verifying the various parameters only if a test step 42 makes it possible to check that the speed of the vehicle is below a threshold value. Advantageously, the various parameters are verified in real time so that the method for presenting information is responsive each time the vehicle is started or restarted.

The preceding description clearly explains how the invention makes it possible to achieve the set objectives and, in particular, to propose a method for presenting information upon starting an automotive vehicle in which the driver and the occupants of the vehicle are notified of the state of the vehicle before it is started, in particular by verifying various parameters associated with the vehicle beforehand and by projecting information summarizing the various verifications carried out individually for each of the parameters onto a specific area of the passenger compartment of the vehicle.

Of course, various modifications may be made by a person skilled in the art to the driving assistance device that has just been described by way of non-limiting example, as long as at least one light beam is implemented so as to illuminate a particular area of the passenger compartment, in particular separate from the instrument panel which is otherwise equipped with backlit indicator lights, in order to make it possible for both the driver and the other occupants of the vehicle to read the information.

In any event, the invention should not be regarded as limited to the embodiment specifically described in this document and in particular embraces all equivalent means and any technically operative combination of those means.

The invention claimed is:

1. A method for presenting information upon starting an automotive vehicle, the method comprising:

verifying various parameters associated with the vehicle thereby generating first verified parameters and second verified parameters, the second verified parameters forming a functional group different from a functional group of the first verified parameters;

projecting a particular light beam onto a specific area of a passenger compartment of the vehicle when a state of the first verified parameters allows said vehicle to be started; and projecting another particular light beam onto another specific area of the passenger compartment of the vehicle when the state of the second verified parameters allows said vehicle to be started.

2. The method according to claim 1, wherein the specific area and the another specific area are lit up in successive sequences.

3. The method according to claim 1, wherein a first alternative light beam, separate from said particular light beam, is projected onto said specific area, or in proximity thereto, when one or more of the first verified parameters does not allow said vehicle to be started.

4. The method according to claim 3, wherein a second alternative light beam, separate from said particular light beam and from said first alternative light beam, is projected onto said specific area, or in proximity thereto, when each of the first verified parameters allows said vehicle to be started and at least one of the first verified parameters requires attention of a driver.

5. The method according to claim 3, wherein a control module receives information arising from a plurality of sensors configured to verify one of the various parameters associated with the vehicle, said control module comparing each item of the received information with a database specific to each verified parameter and deducing therefrom whether to project said particular light beam or said first alternative light beam.

6. The method according to claim 1, wherein the first verified parameters include both internal parameters and external parameters with respect to the vehicle.

7. The method according to claim 6, wherein the external parameters are verified by sensors on board the vehicle and configured to detect a situation of a road scene in which the vehicle is engaged.

8. The method according to claim 7, wherein one of the external parameters is a presence of one or more road users in a blind spot of the vehicle.

9. The method according to claim 6, wherein the internal parameters are verified by sensors on board the vehicle and configured to detect a respective operating state of the vehicle.

10. The method according claim 9, wherein at least some of the internal parameters relate to an active or passive safety device of the vehicle.

11. The method according to claim 6, wherein at least some of the internal parameters relate to drive, braking, and/or steeringelements of the vehicle.

12. The method according claim 1, wherein said particular light beam is projected onto the specific area of the passenger compartment from a second area of the passenger compartment, which is separate from said specific area.

13. The method according to claim 12, wherein said particular light beam is projected onto a front window pillar or onto a portion of a windscreen, from an interior central rear-view mirror or from an area close to a rear-view mirror.

14. The method according to claim 1, wherein the various parameters are verified and said particular light beam is projected when a speed of the vehicle is below a threshold value.

15. A method for presenting information upon starting an automotive vehicle, the method comprising:
   verifying various parameters associated with the vehicle to thereby generate verified parameters; and
   projecting a particular light beam onto a specific area of a passenger compartment of the vehicle when a state of the verified parameters allows said vehicle to be started;
   projecting a first alternative light beam, separate from said particular light beam, onto said specific area, or in proximity thereto, when one or more of the verified parameters does not allow said vehicle to be started; and
   projecting a second alternative light beam, separate from said particular light beam and from said first alternative light beam, onto said specific area, or in proximity thereto, when each of the verified parameters allows said vehicle to be started and at least one of the verified parameters requires attention of a driver.

16. The method according to claim 15, wherein a control module receives information arising from a plurality of sensors configured to verify one of the various parameters associated with the vehicle, said control module comparing each item of the received information with a database specific to each verified parameter and deducing therefrom whether to project said particular light beam, said first alternative light beam, or said second alternative light beam.

17. A method for presenting information upon starting an automotive vehicle, the method comprising:
   verifying various parameters associated with the vehicle to thereby generate verified parameters; and
   projecting a particular light beam onto a specific area of the passenger compartment of the vehicle when the state of the verified parameters allows said vehicle to be started, wherein
   the verified parameters include an external parameter with respect to the vehicle, the external parameter indicating the presence of one or more road users in a blind spot of the vehicle, and the external parameter being verified by sensors on board the vehicle that are configured to detect a situation of a road scene in which the vehicle is engaged.

18. The method according to claim 17, wherein the verified parameters include internal parameters with respect to the vehicle, and the internal parameters are verified by sensors on board the vehicle and configured to detect a respective operating state of the vehicle.

19. The method according claim 18, wherein at least one of the internal parameters relates to one or more elements selected from an active or passive safety device of the vehicle, a drive element of the vehicle, a braking element of the vehicle, and steering element of the vehicle.

20. The method according claim 17, wherein said particular light beam is projected onto the specific area of the passenger compartment from a second area of the passenger compartment, said second area being separate from said specific area.

* * * * *